Dec. 30, 1958 H. L. HARTMAN 2,866,346
PLURAL-SPEED PHONOGRAPH TURNTABLE DRIVE MECHANISMS
Filed Feb. 21, 1957 3 Sheets-Sheet 1

INVENTOR
Herbert L. Hartman
BY
ATTORNEYS

Dec. 30, 1958 — H. L. HARTMAN — 2,866,346
PLURAL-SPEED PHONOGRAPH TURNTABLE DRIVE MECHANISMS
Filed Feb. 21, 1957 — 3 Sheets-Sheet 2

INVENTOR
Herbert L. Hartman
BY Shugh & Shugh
ATTORNEYS

Dec. 30, 1958 H. L. HARTMAN 2,866,346
PLURAL-SPEED PHONOGRAPH TURNTABLE DRIVE MECHANISMS
Filed Feb. 21, 1957 3 Sheets-Sheet 3

INVENTOR
*Herbert L. Hartman*
BY
ATTORNEYS

United States Patent Office 2,866,346
Patented Dec. 30, 1958

2,866,346

PLURAL-SPEED PHONOGRAPH TURNTABLE DRIVE MECHANISMS

Herbert L. Hartman, Elyria, Ohio, assignor to The General Industries Company, Elyria, Ohio, a corporation of Ohio Application February 21, 1957, Serial No. 641,642

6 Claims. (Cl. 74—190)

My invention relates to phonograph turntable driving mechanisms and more particularly to a plural speed driving mechanism whereby a phonograph turntable can be frictionally driven at a plurality of predetermined speeds in response to simple operative adjustments by the operator.

In the form shown, my invention specifically discloses a plural speed friction driving mechanism of the above type wherein a motor driven rotor shaft is provided with diametrically different rotor driving portions and is adapted to successively frictionally engage pulley portions of a plurality of pulley elements with either the relatively larger diameter portion of the rotor shaft or the relatively smaller diameter portion of the rotor shaft, said pulley elements being further provided with pulley portions which are adapted to frictionally engage an idler pulley which is adapted to engage the inner periphery of a depending flange of a turntable.

My invention also provides a plural speed friction driving mechanism of the above type which provides an "off" or nondriving position between each of the successive driving positions.

It is, therefore, an object of my invention to provide a plural speed phonograph turntable driving mechanism which can be operatively adjusted to drive a turntable at any one of a plurality of predetermined rotational speeds.

It is a further object of my invention to provide a plural speed driving mechanism of the above type which is simple in operation, composed of but few parts and relatively inexpensive to manufacture.

Another object of my invention is to provide a plural speed driving mechanism of the above type which eliminates the need for levers and complicated linkage arrangements to effect the speed-changing operation thereof.

Still another object of my invention is to provide a plural speed driving mechanism whereby the operator can adjust said mechanism directly to an "off" position from any one of the plurality of driving positions.

Further objects of my invention and the invention itself will be understood by a study of the accompanying specification and the appended drawings, in which drawings.

Figure 1:
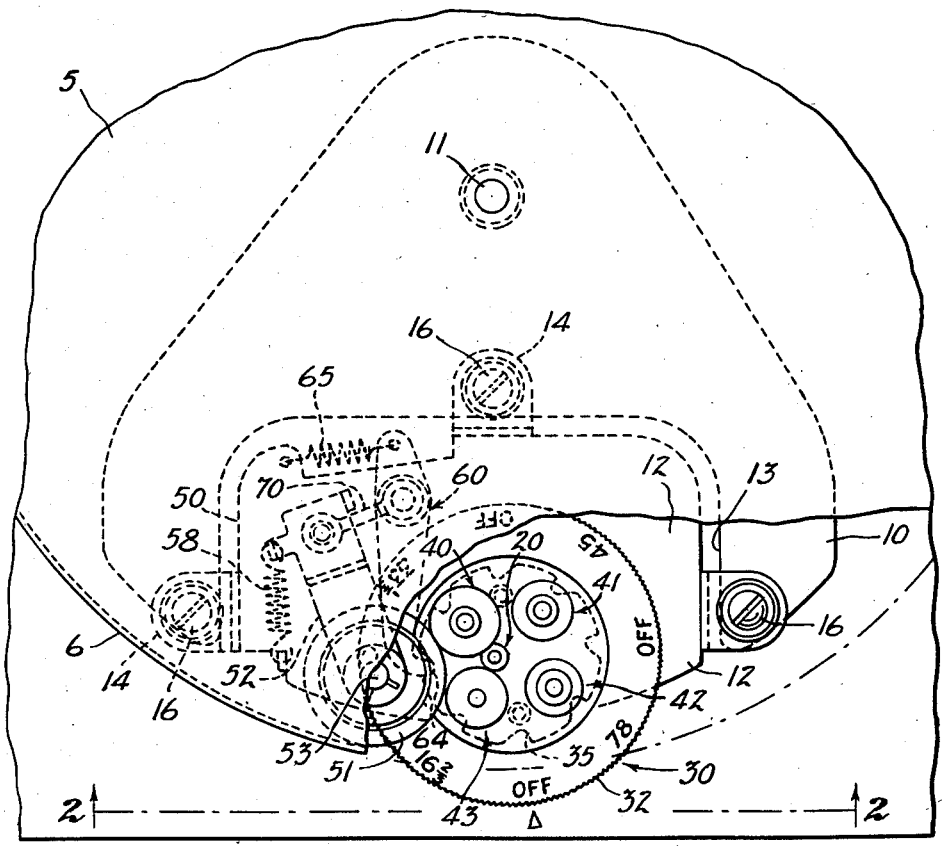
Fig. 1 is a top plan view of the four-speed phonograph turntable driving mechanism of my invention with said driving mechanism being shown in an "off" or nondriving position.
Figure 3:
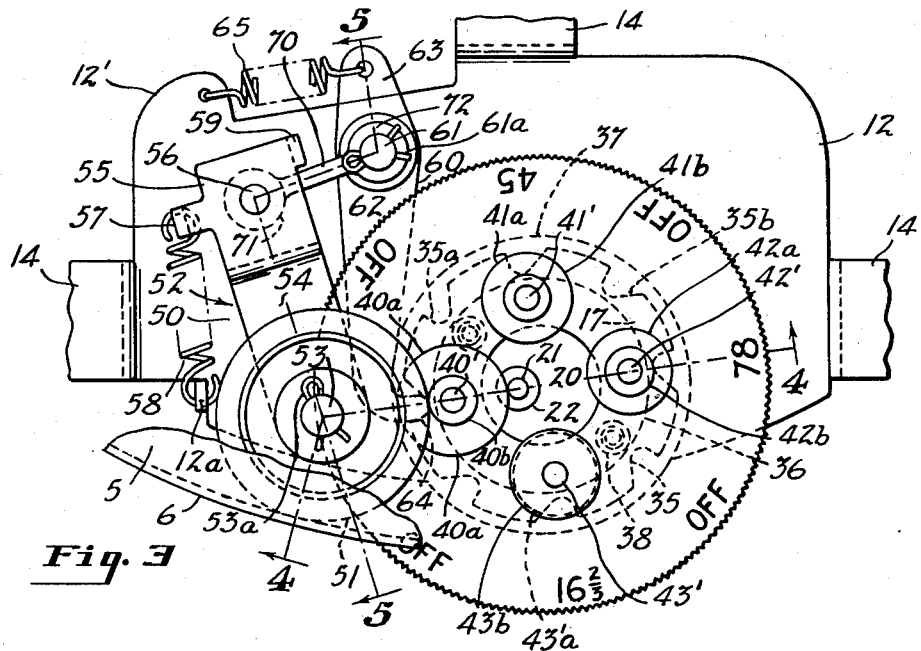
Figure 4:
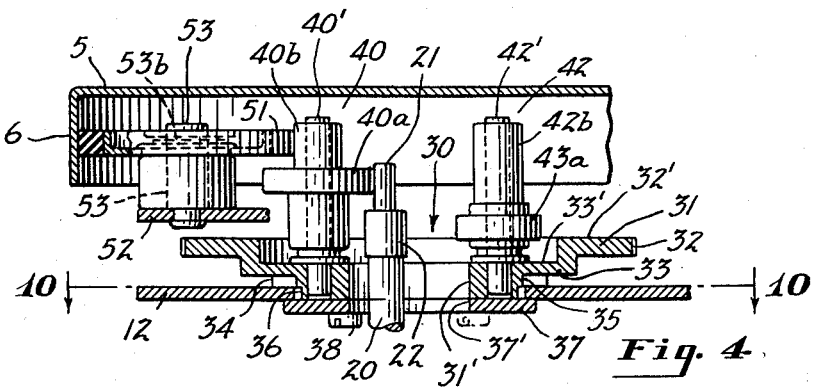
Figure 5:
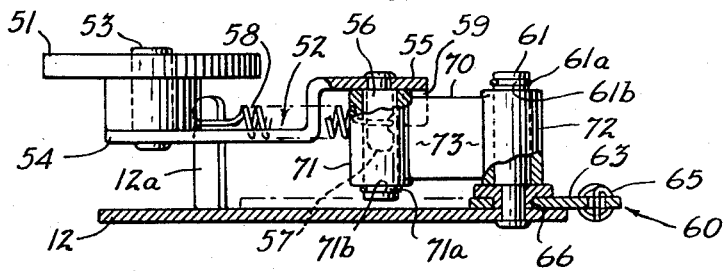
Figure 6:
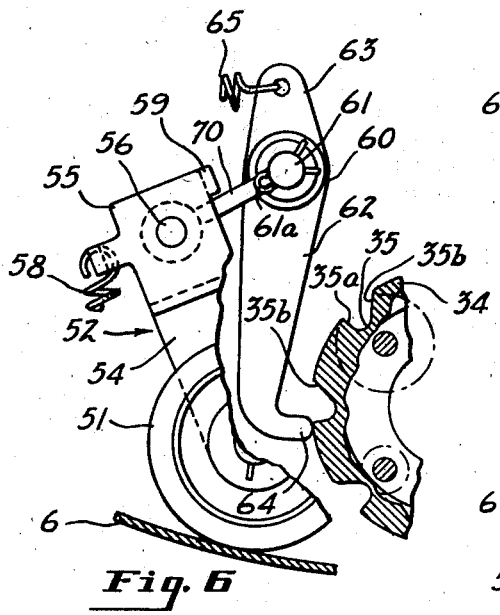
Figure 7:
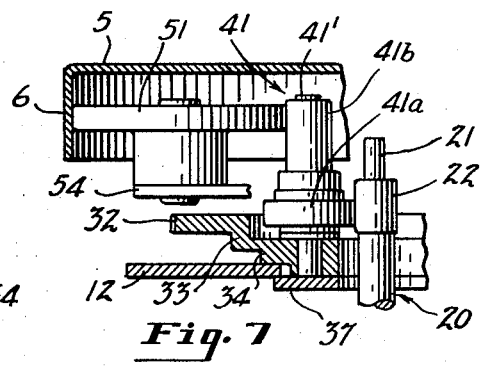
Figure 8:
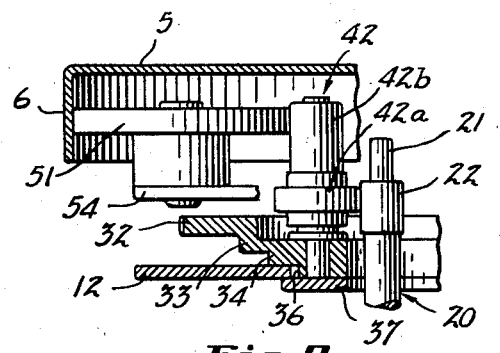
Figure 9:
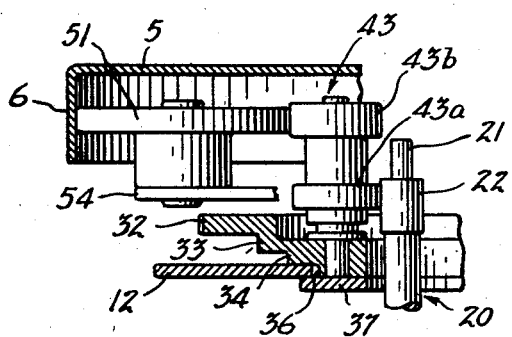
Figure 10:
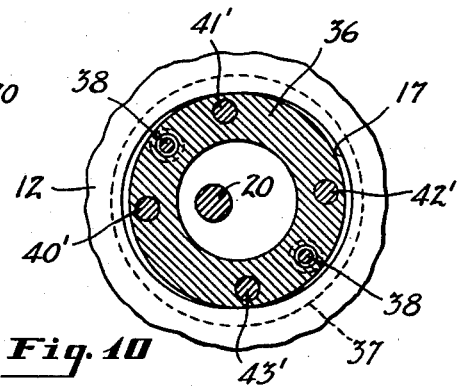

Fig. 3 is an enlarged top plan view of the phonograph turntable driving mechanism of Fig. 1 showing said driving mechanism in one driving position for driving the turntable at 16⅔ R. P. M.;

Fig. 4 is a sectional view taken along the line 4—4 of Fig. 3;

Fig. 5 is a detailed sectional view taken along the line 5—5 of Fig. 3;

Fig. 6 is a detail of a mechanism for indexing a multiple driving pulley mounting plate from successive "off" to drive positions, said mechanism being shown in an intermediate position;

Fig. 7 is a vertical sectional view of the driving elements of my turntable driving mechanism as they are positioned for driving the turntable at 33⅓ R. P. M.;

Fig. 8 is a view similar to Fig. 7 showing the driving elements of my turntable driving mechanism as they are positioned for driving the turntable at 45 R. P. M.;

Fig. 9 is a view similar to Figs. 7 and 8 showing the driving elements of my turntable driving mechanism as they are positioned for driving the turntable at 78 R. P. M.; and Fig. 10 is a horizontal sectional detail taken along the line 10—10 of Fig. 4.

Figure 2:
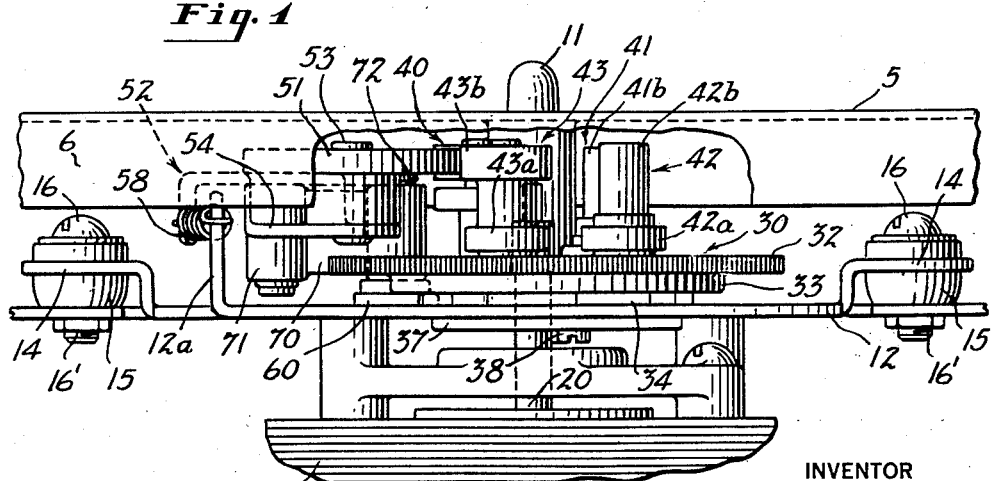
Fig. 2 is a front plan view of the turntable driving mechanism of Fig. 1.

Referring now to the drawings and more particularly to Figs. 1 and 2, I show a mounting plate 10 having a turntable shaft 11 mounted thereon. The mounting plate 10 may be of any suitable shape and is preferably cut away to provide a large opening at 13 into which there is pendantly positioned a subplate 12. The subplate 12 is provided with vertically upwardly and horizontally outwardly directed lugs 14 by which said subplate is mounted upon the mounting plate 10. Between the lugs 14 and the mounting plate 10 there are positioned grommets 15, said grommets being manufactured of rubber or a like resilient material, serving as a cushioning and a sound-absorbing suspension for the subplate 12. Bolts 16 project vertically through suitably aligned apertures in the lugs 14, the grommets 15, and the mounting plate 10 and are provided with nuts 16' on the threaded end thereof.

A turntable 5 is rotatably mounted upon the turntable shaft 11 in a well-known manner, said turntable having a circumferentially continuous depending flange 6 at the radially outer periphery thereof. The turntable 5 extends radially outwardly beyond and is positioned above the mounting plate 10 and the subplate 12.

The multiple speed turntable drive mechanism of my invention is mounted upon the subplate 12 of the mounting plate 10, and comprises a turret assembly 30 and an idler pulley assembly 50.

Referring now particularly to Figs. 3 and 4, the turret assembly 30 comprises a circular turret plate 31 having mounted therewith a plurality of drive pulleys 40, 41, 42 and 43. The turret plate 31 is downwardly, diametrically inwardly, progressively stepped, thereby providing an uppermost adjusting portion 32, a vertically medially disposed drive pulley mounting portion 33 in a plane immediately below said adjusting portion, a further diametrically reduced index portion 34 in a plane immediately below said pulley mounting portion and a still further diametrically reduced journal portion 36 in a plane immediately below said index portion. An upper surface 33' of the pulley mounting portion 33 is recessed below an upper surface 32' of the adjusting portion 32. The index portion 34 of the turret plate 31 is provided with a plurality of circumferentially evenly spaced indexing notches 35, there being eight of said notches in the form shown.

As is best shown in Fig. 10, the journal portion 36 of the turret plate 31 is journaled for rotational movement in the subplate 12, said subplate being suitably apertured to provide a preferably oblong bearing 17. The oblongitudinal shape of the bearing 17 allows the turret assembly 30 to be laterally displaced for a reason to be herein later more fully described.

The drive pulleys 40, 41, 42 and 43 are mounted for free rotational movement upon concentrically positioned, circumferentially evenly spaced, vertically upwardly projecting pulley studs 40', 41', 42', and 43' respectively, said pulley studs being rigidly attached to the pulley mounting portion 33 of the turret plate 31 in any suitable manner.

The turret plate 31 is centrally apertured at 31' and is provided with a turret plate retainer 37 (Fig. 4), said retainer being secured to the lowermost surface of the journal portion 36 of said turret plate, preferably by screws 38 or other suitable means, and having an outer peripheral diameter of such size as to prevent vertical displacement of the turret assembly. The retainer 37 is centrally apertured at 37', said central aperture being concentric with and of the same diametric dimension as the aperture 31' of the turret plate 31.

The driving power for my multiple speed turntable drive mechanism is provided by a motor 18 which is pendantly secured to the lower surface of the subplate 12 in any suitable manner (Fig. 2). The motor 18 is provided with a rotor shaft 20 (Fig. 4) which projects vertically upwardly through the apertures 37' and 31' of the retainer 37 and the turret plate 31 respectively. The rotor shaft 20 extends upwardly above the upper surface 32' of the adjusting portion 32 of the turret plate 31 and is provided at its upper end with two concentric and diametrically different rotor driving portions, the uppermost and diametrically smaller portion being designated by the numeral 21, and the relatively lower and diametrically larger portion being designated by the numeral 22. In the form shown herein, a pair of stepped portions 21 and 22 are employed for this purpose.

By referring to Figs. 3 and 4, it will be noted that the rotor shaft 20 is eccentrically positioned relative to the turret assembly 30 and that the upper rotor driving portion 21 is in frictional engagement with a driven pulley portion 40a of the drive pulley 40. The drive pulleys 40, 41, 42 and 43 are all provided with driven pulley portions such as 40a, 41a, 42a and 43a respectively, and each of said driven pulley portions is adapted to successively frictionally engage the rotor shaft 20 at different of its rotor driving portions 21 or 22. The driven pulley portion 40a of the drive pulley 40 (Fig. 4) is on a plane with and is of such diameter as to frictionally engage the upper rotor driving portion 21 while the driven pulley portions 41a, 42a and 43a of the drive pulleys 41, 42 and 43 (Figs. 7, 8 and 9) are on a plane with and are of such a diameter as to frictionally engage the lower rotor driving portion 22. By rotating the turret assembly 30, therefore, each of said driven pulley portions may be successively brought into engagement with the rotor shaft 20 to be rotationally driven thereby.

The drive pulleys 40, 41, 42 and 43 are further provided with upwardly extending driving pulley portions 40b, 41b, 42b, and 43b respectively, said driving pulley portions being in a plane which is substantially above the driven pulley portions 40a, 41a, 42a, and 43a. As illustrated in Figs. 4, 7, 8 and 9, the driving pulley portions 40b, 41b, 42b, and 43b are adapted to successively frictionally engage an idler pulley 51 of the idler pulley assembly 50. The idler pulley 51 is also adapted to engage the inner periphery of the dependent flange 6 of the turntable 5 thereby rotating said turntable.

In the form of my invention as shown herein, the rotor shaft 20 and the rotor driving portions 21 and 22 are preferably manufactured of a nonresilient material such as metal, whereas the driven pulley portions 40a, 41a, 42a, and 43a of the drive pulleys 40, 41, 42 and 43 respectively have outer peripheral surfaces of rubber or the like resilient material. The driving pulley portions 40b, 41b, 42b and 43b, and the depending flange 6 of the turntable 5 are preferably manufactured of a nonresilient material, and the outer periphery of the interposed idler wheel 51 is preferably formed of rubber or a similar resilient material. It will be understood, therefore, that the frictionally engaging driving and driven surfaces of the various components of my turntable driving mechanism are preferably so arranged that nonresilient surfaces engage resilient surfaces.

By referring to Figs. 2 and 3 it will be noted that the adjusting portion 32 of the turret plate 31 projects radially outwardly from the turntable 5 where it is accessible for manual adjustment. It will be further noted that the uppermost surface 32' of the adjusting portion 32 is provided with circumferentially evenly spaced numbers and words. The numbers, "16⅔," "33⅓," "45" and "78" in the form shown, correspond to the rotational speeds at which different types of phonograph records can be played on the multiple speed turntable driving mechanism of my invention, it being understood, however, that the speeds herein recited are given as examples only and that my invention can be readily adapted to rotate a turntable at any desired speed. The interposed words, "off," correspond to intermediate positions whereby the rotor shaft 20 is not in contact with one of the drive pulleys 40, 41, 42 or 43.

The turret assembly 30 is held in any one of the designated positions, "16⅔," "33⅓," "45," "78," or an "off" position, by means of a detent lever 60 adapted to engage the notches 35 of the index portion 34 of the turret plate 31. The detent lever 60 is pivotally mounted upon a flanged bushing 66 of a vertically upwardly projecting stud 61 of the subplate 12 (Fig. 5) and pivots in a horizontal plane with the lower surface of said detent lever contacting the uppermost surface of said subplate.

The detent lever 60 has two oppositely directed arms 62 and 63 (Fig. 6). The arm 62 is substantially longer than the arm 63 and the arm 62 is provided at the non-pivoted end thereof with a laterally directed, convexly rounded finger detent 64, said detent being so directed and positioned as to engage a selected one of the indexing notches 35 of the index portion 34 when said notch is rotated to a position adjacent said detent. The arm 62 of the detent lever 60 is resiliently urged in a counterclockwise direction by means of a spring 65, said spring being attached to the radially outermost end of the relatively smaller arm 63 at one end of said spring and to a horizontally projecting ear 12' of the subplate 12 at the other end of said spring.

The notches 35 of the index portion 34 are so formed as to provide substantially straight side surfaces 35a and relatively slanting side surfaces 35b, said slanting side surfaces serving as cam means for outwardly camming the detent 64 of the detent lever 60 when the turret plate 31 is rotated in a counterclockwise direction. The turret plate 31 is prevented from moving in a clockwise direction by the straight side surfaces 35a abutting the detent 64 of the detent lever 60.

The idler pulley 51, by which the turntable 5 is proximately rotated, is mounted for free rotational movement upon a vertically upwardly projecting stud 53 of an idler support bracket 52 of the idler assembly 50, said idler pulley being retained upon said stud preferably by means of a retainer 53a snapped into a circumferential groove 53b of said stud. The support bracket 52 is pivotally supported by a bearing portion 71 of a toggle link 70 (Fig. 5). The toggle link 70 comprises a vertically upstanding body portion 73 having two preferably integrally formed, axially vertically disposed bearing portions 71 and 72 disposed at either end of said body portion 73. The bearing portion 72 is pivotally mounted upon the stud 61 of the subplate 12 above the detent lever 60 and the flanged bushing 66, said bearing portion 72 being retained against vertically upward displacement preferably by means of a wire retainer clip 61a snapped into a circumferentially continuous groove 61b adjacent the upper end of said stud 61.

Referring to Figs. 3 and 5, the shape of the idler support bracket 52 will be understood, said bracket being preferably formed of relatively heavy sheet metal and having a horizontally disposed idler pulley support portion 54 and a vertically upwardly stepped, horizontally disposed pivot portion 55, said pivot portion having a vertically downwardly directed pivot stud 56 rigidly secured thereto. The support bracket 52 is pivotally mounted upon the toggle link 70 at the bearing portion 71 of said toggle link by means of the stud 56 projecting downwardly therethrough. A wire clip retainer 71a in a circumferential groove 71b adjacent the lowermost end of the stud 56 retains the support bracket 52 upon the toggle link 70.

The pivot portion 55 of the support bracket 52 is provided with a preferably integrally formed, laterally outwardly and downwardly directed hook 57 (Fig. 3) adjacent the side of said pivot portion away from the toggle link 70 and with a downwardly directed lug 59 adjacent the side of said pivot portion 55 which is directed toward said toggle link. The subplate 12 is provided at its radially outer edge with a vertically upwardly directed hook 12a, said hook 12a being positioned on the same side of the idler support bracket 52 as the hook 57 of said bracket. A tensioned spring 58 is attached at one end of said spring to the hook 57 of the idler support bracket 52 and at the other end of said spring to the hook 12a of the subplate 12.

Referring particularly to Fig. 3 it will be noted that the idler pulley assembly 50 is pivotal relative to both the bearing 71 of the toggle link 70 and the stud 61 of the subplate 12. The spring 58 urges the idler pulley 51 of the idler pulley assembly 50 in a counterclockwise direction thereby resiliently biasing said idler pulley into engagement with the depending flange 6 of the turntable 5 and with one of the drive pulleys 40, 41, 42 or 43 of the turret assembly 30.

Referring now to Figs. 4, 7, 8 and 9, it will be noted that the drive pulleys 40, 41, 42 and 43 have driven pulley portions and driving pulley portions of varying relative diameters, such variance providing a different rate of rotational drive of the turntable 5 when different of said drive pulleys is in frictional engagement with both the rotor shaft 20 and the idler pulley 51. In the form of my invention as shown herein, the drive pulley 40 is adapted to transmit the rotational motion of the rotor shaft 20 to the idler pulley 51 whereby said idler pulley will drive the turntable 5 at a rotational speed of 16⅔ R. P. M.; the drive pulley 41 is adapted to similarly transmit such motion whereby said turntable rotates at a speed of 33⅓ R. P. M.; the drive pulley 42 is adapted to transmit such motion at 45 R. P. M.; and the drive pulley 43 transmits such motion at 78 R. P. M. When each of the drive pulleys 40, 41, 42 and 43 is in driving position, the number on the upper surface 32' of the adjusting portion 32 of the turret plate 31 which corresponds to the rotational speed at which the turntable is being driven is positioned radially outwardly from the turntable 5 in full view of the operator. When the turret plate 31 is rotated to an intermediate position whereby none of the drive pulleys is in driving position one of the words "off" disposed between each speed marking on the adjusting disc 32 is positioned in full view of the operator.

In view of the foregoing description, it will be understood that the multiple speed turntable driving mechanism of my invention operates in the following manner. When the operator wishes to play a phonograph record, he manually rotates the turret assembly 30 in a counter-clockwise direction by means of the adjusting portion 32 of the turret plate 31 to a position whereby the desired rotational speed is indicated on the upper surface 32' of said adjusting portion in view of the operator. During such motion the detent finger 64 of the detent lever 60 is cammed radially outwardly from the turret assembly 30 by the slanting side surfaces 35b of the notches 35 in the index portion 34, said detent successively engaging and disengaging alternate "off" and driving notches until the desired position has been reached. As each of the drive pulleys 40, 41, 42 and 43 is brought into a driving position relative to the rotor shaft 20, the idler pulley 51, by means of the support bracket 52, the spring 58, and the toggle link 70, resiliently adjusts itself to a frictional driving engagement with whichever drive pulley is in driving position and with the flange 6 of the turntable 5.

Referring now to Fig. 3 in which the drive pulley 40 is shown in a driving position between the rotor shaft 20 and the idler pulley 51, it will be noted that said rotor shaft, said drive pulley, said idler pulley, the detent 64 of the detent lever 60, and the turret plate 31 are all substantially aligned in a horizontal direction, and that the turret assembly 30, by means of the oblong bearing 17 in the subplate 12 (Fig. 10), is capable of lateral displacement in a horizontal direction corresponding to the direction of substantial alignment of the recited parts. The turret assembly 30, due to the oblongitudinal shape of the bearing 17, is free to shift slightly relative to the rotor shaft 20, thereby bringing the driven portion 40a of the drive pulley 40 into frictional engagement with the upper rotor driving portion 21 of said rotor shaft. The turret assembly 30 and the drive pulley 40 are resiliently biased in the direction of the rotor shaft 20 by means of the detent lever 60 and the idler pulley 51. When, therefore, each of the drive pulleys 40, 41, 42 and 43 is successively rotated to a driving position, the turret assembly 30 and the idler pulley assembly 50 automatically adjust to positions whereby a continuous, rotationally transmissive, frictional engagement is established from the rotor shaft 20 through one of said drive pulleys and said idler pulley to the flange 6 of the turntable 5.

The ease with which the turret assembly 30 can be shifted to its various driving positions depends upon the concentricity of the drive pulleys 40, 41, 42 and 43 mounted therewith and upon the relative diameters of the driving pulley portions 40b, 41b, 42b and 43b respectively of said drive pulleys. If the vertical axes of the drive pulleys 40, 41, 42 and 43 were not concentrically located relative to the turret plate 31, the oblong bearing 17 of the subplate 12 would have to be provided with a greater maximum dimension to allow for greater movement of said turret plate thereby resulting in more difficult shifting; if the driving pulley portions 40b, 41b 42b and 43b varied excessively in their relative diametric dimensions, the extent of adjustment of the idler pulley 51 would be correspondingly increased which would also result in more difficult shifting. The combination of relative diameters between the various driving and driven portions of the turntable driving mechanism as illustrated and described herein is such that maximum efficiency in driving and shifting is obtained.

It will be understood, however, that many departures from the details of my invention as it is herein described and illustrated may be made, such as changes in size and dimension, wthout departing from the spirit of my invention or the scope of the appended claims.

What I claim is:

1. A multiple speed phonograph turntable driving mechanism adapted to rotate a turntable having a circumferentially continuous dependent flange and including a mounting plate and means for rotatably mounting said turntable upon said mounting plate, a motor pendently supported beneath said mounting plate and having a rotor shaft projecting vertically upwardly above the uppermost surface of said mounting plate, said driving mechanism comprising a circumferentially continuous turret plate, said turret plate having a circular journal portion journaled within an oblong aperture in said mounting plate and being capable of lateral displacement in one direction, said turret plate being centrally apertured, said rotor shaft projecting vertically upwardly through said aperture in said turret plate, said turret plate being axially eccentrically mounted relative to said rotor shaft, said rotor shaft having large and small, diametrically stepped, superposed rotor driving portions at the uppermost end of said rotor shaft, a plurality of intermediate drive pulleys rotatably mounted upon said turret plate, said drive pulleys being radially concentrically positioned and circumferentially evenly spaced upon said turret plate, said drive pulleys having driven pulley portions and driving pulley portions thereon, at least one of said driven pulley portions being capable of frictional engagement with said large rotor driving portion when said turret plate is rotated to one driving position, said drive pulleys having driving pulley portions concentric with and positioned above said driven pulley portions, said turret plate having a circular index portion, said index portion having notches in the outer periphery thereof above the upper surface of said mounting plate, a detent lever pivotally mounted upon the upper surface of said mounting plate, spring means resiliently biasing said detent lever into engagement with said notches whereby said turret plate and one of said drive pulleys are retained in one of said driving positions or an intermediate non-driving position between two adjacent driving positions, said detent lever laterally resiliently biasing each of said drive pulleys of said turret plate into engagement with said rotor shaft when each of said drive pulleys is in a driving position, an idler pulley rotatably mounted upon a support bracket, said support bracket pivotally mounted relative to said mounting plate, spring means biasing said idler pulley into simultaneous frictional engagement with said flange of said turntable and a driving pulley portion of one of said drive pulleys when one of said drive pulleys is in a driving position, and means projectng radially outwardly beyond said turntable whereby said turret plate is manually adjustable.

2. In a phonograph having a mounting plate, a motor pendently supported beneath said mounting plate and having a rotor shaft projecting vertically upwardly above the upper surface of said mounting plate, said rotor shaft having diametrically different portions on the upper end thereof, a turntable shaft projecting vertically upwardly from said mounting plate, a turntable rotatably mounted upon said turntable shaft and having a circumferentially continuous depending flange, the combination with a multiple speed turntable driving mechanism comprising a plurality of drive pulleys concentrically mounted upon a centrally apertured turret plate, said turret plate rotatably mounted upon said mounting plate and adapted for lateral movement in one direction, adjusting means rotatably movable in a continuous path for rotating said turret plate, said rotor shaft projecting upwardly through said aperture in said turret plate and being eccentric therewith, means for biasing said turret plate in a direction whereby the eccentricity of said rotor shaft to said turret plate is increased, each of said drive pulleys having a portion frictionally contacting a portion of said rotor shaft when each of said drive pulleys is rotated to a position most nearly adjacent said rotor shaft, an idler pulley adapted to simultaneously frictionally engage the inner periphery of said turntable flange and a portion of each of said drive pulleys when each of said drive pulleys is frictionally engaging said rotor shaft, means for biasing said idler pulley and means for retaining each of said drive pulleys in a frictional driving position relative to said rotor shaft.

3. A multiple speed phonograph turntable driving mechanism adapted to operate in combination with a rotatably mounted turntable having a circumferentially continuous depending flange and comprising a mounting plate, a centrally apertured circular turret plate rotatably journaled in said mounting plate within an oblong bearing aperture, said turret plate being capable of lateral displacement in one direction within said oblong bearing aperture, a plurality of drive pulleys rotatably mounted upon said turret plate, an upwardly projecting motor driven rotor shaft projecting through said aperture in said turret plate, said rotor shaft having two concentric rotor driving portions of different diameters adjacent the upper end thereof, said drive pulleys having driven pulley portions and driving pulley portions, each of said driven pulley portions of said drive pulleys adapted to frictionally engage one of said rotor driving portions of said rotor shaft upon rotation of said turret plate to one circumferential position thereof, an idler pulley adapted to drive said turntable, said driving pulley portions of said drive pulleys adapted to frictionally engage said idler pulley, means for resiliently biasing said idler pulley into frictional engagement with said turntable flange and said driving portions of said drive pulleys, each of said drive pulleys adapted to transmit rotational movement from said rotor shaft through said idler pulley to said turntable flange at a different rotational speed.

4. A multiple speed phonograph turntable driving mechanism adapted to operate in combination with a rotatably mounted turntable having a circumferentially continuous depending flange and comprising a mounting plate, a centrally apertured circular turret plate rotatably journaled in said mounting plate within an oblong bearing aperture, said turret plate being capable of lateral displacement in one direction within said oblong bearing aperture, said turret plate being capable of complete and continuous rotational movement in one direction, a plurality of drive pulleys rotatably mounted upon said turret plate, an upwardly projecting motor driven rotor shaft projecting through said aperture in said turret plate, said rotor shaft having two concentric rotor driving portions of diffeent diameters adjacent the upper end thereof, said drive pulleys having driven pulley portions and driving pulley portions, each of said driven pulley portions of said drive pulleys adapted to frictionally engage one of said rotor driving portions of said rotor shaft upon rotation of said turret plate to one circumferential pos.tion thereof, an idler pulley adapted to drive said turntable, said driving pulley portions of said drive pulleys adapted to frictionally engage one of said rotor driving portions of said rotor shaft upon rotation of said turret plate to one circumferential position thereof, said driving pulley portions of said drive pulleys adapted to frictionally engage said idler pulley, means for resiliently biasing said idler pulley into frictional engagement with said turntable flange and said driving portions of said drive pulleys, each of said drive pulleys adapted to transmit rotational movement from said rotor shaft through said idler pulley to said turntable flange at a different rotational speed.

5. A multiple speed phonograph driving mechanism adapted to operate in combination with a rotatably mounted turntable having a circumferentially continuous depending flange and comprising a mounting plate, a centrally apertured circular turret plate rotatably journaled in said mounting plate within an oblong bearing aperture, said turret plate being capable of lateral displacement in one direction within said oblong bearing aperture, said turret plate being continuously rotatable in a counterclockwise direction, a plurality of drive pulleys rotatably mounted upon said turret plate, an upwardly projecting motor driven rotor shaft projecting through said aperture in said turret plate, said rotor shaft having two concentic rotor driving portions of different diameters adjacent the upper end thereof, said drive pulleys having driven pulley portions and driving pulley portions, each of said driven pulley portions of said drive pulleys adapted to frictionally engage one of said rotor driving portions of said rotor shaft upon rotation of said turret plate to one circumferential position thereof, an idler pulley adapted to drive said turntable, said driving pulley portions of said drive pulleys adapted to frictionally engage said idler pulley, means for resiliently biasing said idler pulley into frictional engagement with said turntable flange and said driving portions of said drive pulleys, each of said drive pulleys adapted to transmit rotational movement from said rotor shaft through said idler pulley to said turntable flange at a different rotational speed.

6. A multiple speed phonograph turntable driving mechanism adapted to operate in combination with a rotatably mounted turntable having a circumferentially continuous depending flange and comprising a mounting plate, a centrally apertured circular turret plate rotatably journaled in said mounting plate, said turret plate adapted to be laterally displaced in one direction, adjusting means rotatably movable in a continuous path for rotating said turret plate, a plurality of drive pulleys rotatably mounted upon said turret plate, an upwardly projecting motor driven rotor shaft projecting through said aperture in said turret plate, said rotor shaft having concentric rotor driving portions of different diameters adjacent the upper end thereof, said drive pulleys having driven pulley portions and driving pulley portions, each of said driven pulley poritons of said drive pulleys adapted to frictionally engage a selected one of said rotor driving portions of said rotor shaft upon rotation of said turret plate to one circumferential position thereof, an idler pulley adapted to drive said turntable, said driving pulley portions of said drive pulleys adapted to frictionally engage said idler pulley, means for resiliently biasing said idler pulley into frictional engagement with said turntable flange and said driving portions of said drive pulleys, each of said drive pulleys adapted to transmit rotational movement from said rotor shaft through said idler pulley to said turntable flange at a different rotational speed.

References Cited in the file of this patent

UNITED STATES PATENTS

| | | |
|---|---|---|
| 2,262,731 | Gruber | Nov. 11, 1941 |
| 2,688,255 | Hickey | Sept. 7, 1954 |
| 2,803,141 | Hartman | Aug. 20, 1957 |

FOREIGN PATENTS

| | | |
|---|---|---|
| 880,829 | Germany | June 25, 1953 |